(12) United States Patent
Thattil (10) Patent No.: US 8,046,358 B2
(45) Date of Patent: Oct. 25, 2011

(54) CONTEXT-BASED INFORMATION RETRIEVAL

(75) Inventor: Jiny Antony Thattil, Bangalore (IN)

(73) Assignee: GE Healthcare, Schenectady, NY (US)

( * ) Notice: Subject to any disclaimer, the term of this patent is extended or adjusted under 35 U.S.C. 154(b) by 1262 days.

(21) Appl. No.: 11/675,815

(22) Filed: Feb. 16, 2007

(65) Prior Publication Data

US 2008/0201350 A1 Aug. 21, 2008

(51) Int. Cl.
*G06F 17/30* (2006.01)

(52) U.S. Cl. ............... 707/736; 707/755; 707/771

(58) Field of Classification Search ............ None
See application file for complete search history.

(56) References Cited

U.S. PATENT DOCUMENTS

| | | |
|---|---|---|
| 6,915,308 B1 | 7/2005 | Evans et al. |
| 2005/0071741 A1 | 3/2005 | Acharya et al. |
| 2006/0100738 A1 * | 5/2006 | Alsafadi et al. ............... 700/214 |
| 2006/0136417 A1 | 6/2006 | Avinash et al. |
| 2006/0136466 A1 | 6/2006 | Weiner et al. |
| 2006/0136467 A1 | 6/2006 | Avinash et al. |
| 2007/0150517 A1 * | 6/2007 | Malone ................... 707/104.1 |

FOREIGN PATENT DOCUMENTS

WO  WO00/75808 A1  12/2000

\* cited by examiner

*Primary Examiner* — Belix M Ortiz
(74) *Attorney, Agent, or Firm* — Fletcher Yoder P.C.

(57) ABSTRACT

In accordance with aspects of the present technique, a method of retrieving information of interest is presented. The method includes parsing data based upon a predefined context definition. Further, the method includes interpreting the parsed data based on the predefined context definition. In addition, the method includes adding contextual attributes to the interpreted data to generate meta-data. Systems and computer-readable medium that afford functionality of the type defined by this method is also contemplated in conjunction with the present technique.

25 Claims, 8 Drawing Sheets

CONTEXT-BASED INFORMATION RETRIEVAL

BACKGROUND

The invention relates generally to information retrieval, and more particularly to methods and systems for context-based information retrieval.

Diagnostic imaging systems have emerged into an essential aspect of patient care. Medical images that are obtained via the diagnostic imaging sessions have evolved as tools that allow a clinician non-invasive means to view anatomical cross-sections of internal organs, tissues, bones and other anatomical regions of a patient. More particularly, the medical images serve the clinician in diagnosis of disease states, determination of suitable treatment options and/or monitoring the effects of treatment, to name a few. As will be appreciated, medical images may be obtained from a broad spectrum of imaging modalities, such as, but not limited to computed tomography (CT) imaging, ultrasound imaging, magnetic resonance (MR) imaging, digital mammography, X-ray imaging, nuclear medicine imaging, or positron emission tomography (PET) imaging, or combinations of the above.

Additionally, the diagnostic imaging systems may also be configured to generate one or more log files. As will be appreciated, a log file may be representative of a file that lists actions that have occurred. More particularly, the log file may include functions and activities performed by the imaging system, often in a time-associated format, for example. Furthermore, the log file may include data representative of events, errors, machine critical parameters, sensor outputs, or a combination thereof. Accordingly, these log files may be used by a technician to facilitate detection of faults associated with the diagnostic imaging system and subsequent diagnosis and/or servicing.

As will be appreciated, these log files typically include a substantial amount of data. Accordingly, analyzing the log files to retrieve relevant information is a tedious and cumbersome process. A wide array of techniques has been developed to aid in the retrieval of relevant information from the log files. Unfortunately, the large amount of log data that must be analyzed may overwhelm the presently available techniques, thereby resulting in a time-consuming and often error-prone process. This may be especially problematic in systems that handle high volumes of log data. Furthermore, analysis of the large amount of data in the log files may inordinately lead to delays in fault detection, diagnosis and subsequent servicing of the diagnostic imaging system, and may adversely affect system availability.

Additionally, the presently available techniques for information retrieval are typically generic in nature, and fail to provide domain specific information. In other words, the techniques currently in use generally employ probabilistic, statistical and/or adaptive approaches to retrieve information. However, these generic techniques fail to respond to complex information retrieval and domain specific rules.

It may therefore be desirable to develop a robust technique and system for the systematic retrieval of domain specific information that advantageously facilitates substantially superior fault detection, diagnosis and service of the diagnostic imaging system. In particular, there is a need for a system that may be configured to aid in enhancing ease of analyzing log data, thereby simplifying the maintenance workflow of the diagnostic imaging system.

BRIEF DESCRIPTION

In accordance with aspects of the present technique, a method of retrieving information of interest is presented. The method includes parsing data based upon a predefined context definition. Further, the method includes interpreting the parsed data based on the predefined context definition. In addition, the method includes adding contextual attributes to the interpreted data to generate meta-data. Computer-readable medium that afford functionality of the type defined by this method is also contemplated in conjunction with the present technique.

In accordance with further aspects of the present technique an information retrieval system is presented. The system includes an extractor module configured to parse data based upon a predefined context definition. Additionally, the system includes an interpreter module configured to interpret the parsed data based on the predefined context definition, and add contextual attributes to the interpreted data to generate meta-data.

In accordance with further aspects of the present technique, a system is presented. The system includes a data source, where the data source includes an acquisition subsystem configured to acquire data, and a processing subsystem in operative association with the acquisition subsystem configured to process the acquired data, and to generate log data. Furthermore, the system includes a data storage subsystem configured to store the log data. Additionally, the system includes an information retrieval subsystem in operative association with the data storage subsystem and configured to parse the log data based upon a predefined context definition, interpret the parsed log data based on the predefined context definition, and add contextual attributes to the interpreted log data to generate meta-data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, a method for context-based information retrieval and a system for context-based information retrieval configured to optimize and simplify fault detection, diagnosis and/or servicing of a diagnostic imaging system, are presented. Employing the method and system described hereinafter, the system for information retrieval may be configured to extract relevant information from a log file and interpret the extracted information in light of predefined contexts, thereby aiding a technician or service engineer involved in repairing or maintaining the system.

Although, the exemplary embodiments illustrated hereinafter are described in the context of a medical imaging system, it will be appreciated that use of the diagnostic system in industrial applications is also contemplated in conjunction with the present technique. For example, embodiments of the present technique may be used to extract relevant information, and interpret the extracted information, from log files generated by the control systems of aircraft engines, airplanes, generators, turbines, machine tools, power plants, or many other types of industrial applications.

Figure 1:
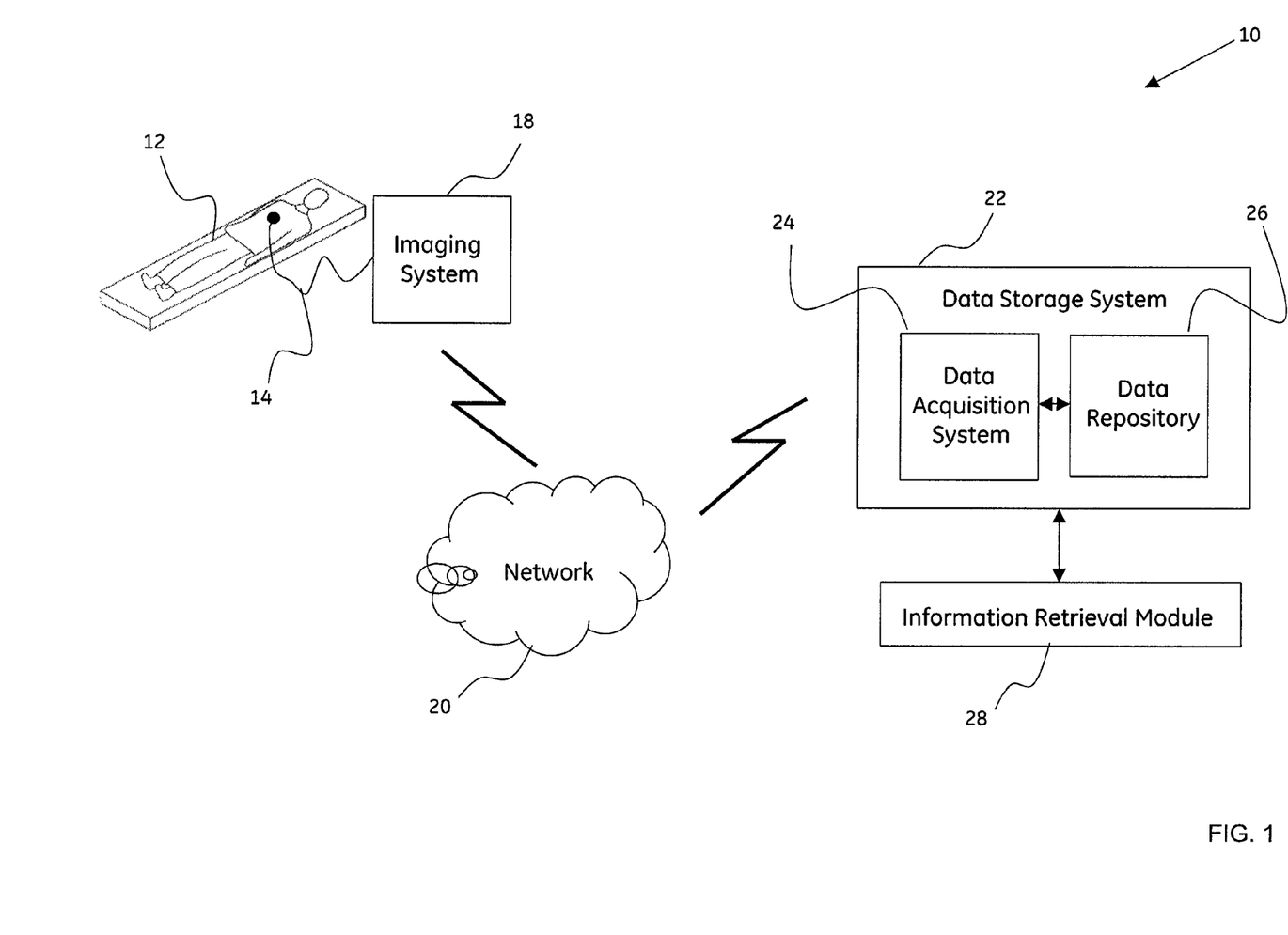
FIG. 1 is a block diagram of an exemplary diagnostic system, in accordance with aspects of the present technique.

FIG. 1 is a block diagram of an exemplary system 10 for use in diagnostic imaging in accordance with aspects of the present technique. The system 10 may be configured to acquire image data from a patient 12 via an image acquisition device 14. In one embodiment, the image acquisition device 14 may include a probe, where the probe may include an invasive probe, or a non-invasive or external probe, such as an external ultrasound probe, that is configured to aid in the acquisition of image data. Also, in certain other embodiments, image data may be acquired via one or more sensors (not shown) that may be disposed on the patient 12. By way of example, the sensors may include physiological sensors (not shown) such as electrocardiogram (ECG) sensors and/or positional sensors such as electromagnetic field sensors or inertial sensors. These sensors may be operationally coupled to a data acquisition device, such as an imaging system, via leads (not shown), for example.

The system 10 may also include an imaging system 18 that is in operative association with the image acquisition device 14. In a presently contemplated configuration, the imaging system 18 may include a medical imaging system. It may be noted that although the present example illustrates the diagnostic system 10 as including one imaging system 18, the diagnostic system 10 may include more than one imaging system.

It should be noted that although the exemplary embodiments illustrated hereinafter are described in the context of a medical imaging system, other imaging systems and applications such as industrial imaging systems and non-destructive evaluation and inspection systems, such as pipeline inspection systems, liquid reactor inspection systems, are also contemplated. Additionally, the exemplary embodiments illustrated and described hereinafter may find application in multi-modality imaging systems that employ ultrasound imaging in conjunction with other imaging modalities, position-tracking systems or other sensor systems. Furthermore, it should be noted that although the exemplary embodiments illustrated hereinafter are described in the context of a medical imaging system, such as, but not limited to, an ultrasound imaging system, an optical imaging system, a computed tomography (CT) imaging system, a magnetic resonance (MR) imaging system, an X-ray imaging system, or a positron emission tomography (PET) imaging system, or combinations thereof, other imaging systems, such as, but not limited to, a pipeline inspection system, a liquid reactor inspection system, a manufacturing inspection system, or other imaging systems are also contemplated in accordance with aspects of the present technique.

In addition to acquiring image data, the medical imaging system 18 may also be configured to generate one or more log files. As will be appreciated, a log file may be representative of a file that lists actions that have occurred. More particularly, the log file may include functions and activities performed by the imaging system, often in a time-associated format, for example. Furthermore, the log file may include data representative of events, errors, machine critical parameters, sensor outputs, or a combination thereof. Also, the log file may include machine-readable data.

As will be appreciated, the image data acquired via the medical imaging system 18 may be stored in a database, for example. Additionally, the image data may be communicated to a first storage 22. In a presently contemplated configuration, the first storage 22 may include a data storage system. Also, in one embodiment, the data storage system 22 may be at a location that is physically remote from the location of the medical imaging system 18. However, as will be appreciated, in certain embodiments, the data storage system 22 may be disposed in substantially close proximity to the imaging system 18. Moreover, in one embodiment, the image data may be communicated to the data storage system 22 via a network 20.

Additionally, the one or more log files generated by the imaging system 18 may also be communicated to the data storage system 22 via the network 20. It may be noted that other means of communication, such as, but not limited to, the Internet, the intranet, or wireless communication may also be employed to transmit the log files from the medical imaging system 18 to the data storage system 22. Furthermore, in one embodiment, the one or more log files may be transmitted to the data storage system 22 in real-time. Alternatively, the one or more log files may be communicated to the data storage system 22 may be temporarily stored in a temporary storage and communicated to the data storage system 22 at a later time.

In addition, the data storage system 22 may include a data acquisition subsystem 24 that may be configured to receive the log files transmitted from the medical imaging system 18 via the network 20. The log files received by the data acquisition system 24 may be stored in a data repository 26. In one embodiment, the data repository 26 may include an archival site, a database, or an optical data storage article. It may be noted that the optical data storage article may be an optical storage medium, such as a compact disc (CD), a digital versatile disc (DVD), multi-layer structures, such as DVD-5 or DVD-9, multi-sided structures, such as DVD-10 or DVD-18, a high definition digital versatile disc (HD-DVD), a Blu-ray disc, a near field optical storage disc, a holographic storage medium, or another like volumetric optical storage medium, such as, for example, two-photon or multi-photon absorption storage format.

In accordance with exemplary aspects of the present technique, the diagnostic system 10 may also include an information retrieval module 28, where the information retrieval module 28 may be configured to aid in extracting relevant information from the log files, and interpreting that information. The working of the information retrieval module 28 will be explained in greater detail with reference to FIGS. 3-8.

Figure 2:
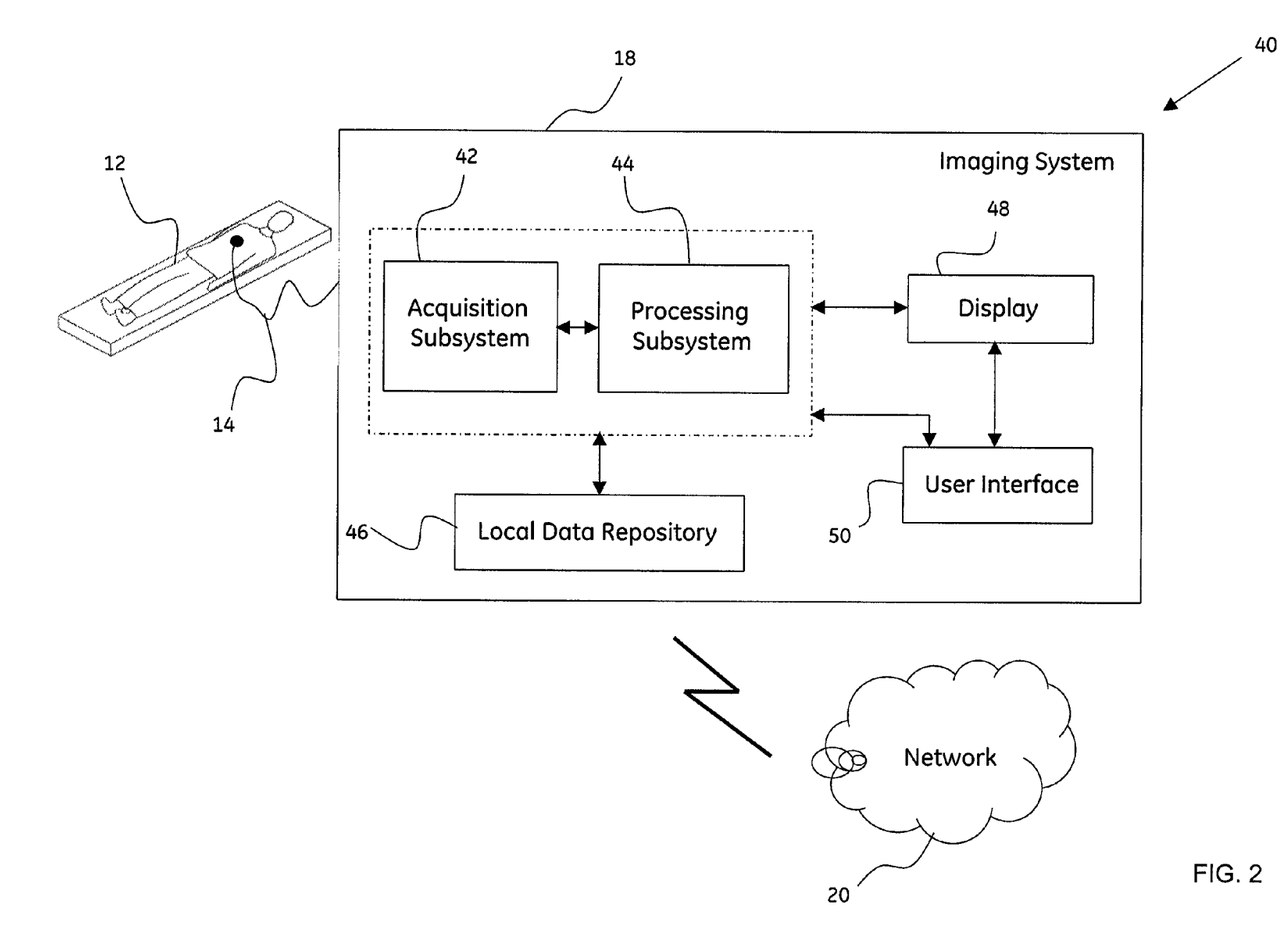
FIG. 2 is a block diagram of an imaging system in the diagnostic system of FIG. 1, in accordance with aspects of the present technique.

Turning now to FIG. 2, a block diagram 40 of the imaging system 18 (see FIG. 1) is illustrated. The imaging system 40 may be configured to acquire image data from the patient 12 (see FIG. 1) via an image acquisition device 14 (see FIG. 1), as previously noted with reference to FIG. 1. In a presently contemplated configuration, the medical imaging system 40 may include an acquisition subsystem 42 and a processing subsystem 44. Further, the acquisition subsystem 42 of the medical imaging system 40 may be configured to acquire image data representative of one or more anatomical regions of interest in the patient 12 via the image acquisition device 14. The image data acquired from the patient 12 may then be processed by the processing subsystem 44.

Additionally, the image data acquired and/or processed by the medical imaging system 40 may be employed to aid the clinician in identifying disease states, assessing need for treatment, determining suitable treatment options, and/or monitoring the effect of treatment on the disease states. It may be noted that the terms treatment and therapy may be used interchangeably. In certain embodiments, the processing subsystem 44 may be further coupled to a local storage system, such as a local data repository 46, where the local data repository 46 is configured to receive image data. Furthermore, as previously noted, the medical imaging system 18 may also be configured to generate one or more log files, where the data in the log files is representative of an event, an error, machine critical parameters, sensor outputs, or a combination thereof. In one embodiment, the processing subsystem 44 may be configured to generate the one or more log files.

Furthermore, as illustrated in FIG. 2, the medical imaging system 40 may include a display 48 and a user interface 50. However, in certain embodiments, such as in a touch screen, the display 48 and the user interface 50 may overlap. Also, in some embodiments, the display 48 and the user interface 50 may include a common area. In accordance with aspects of the present technique, the display 48 of the medical imaging system 40 may be configured to display an image generated by the medical imaging system 40 based on the image data acquired via the image acquisition device 14. Additionally, in accordance with further aspects of the present technique, information of interest retrieved from the log files may be visualized on the display 48, and will be described in greater detail with reference to FIGS. 3-8.

Further, the user interface 50 of the medical imaging system 40 may include a human interface device (not shown) configured to facilitate the clinician in organizing and/or managing image data displayed on the display 48. The human interface device may include a mouse-type device, a trackball, a joystick, a stylus, or a touch screen. However, as will be appreciated, other human interface devices, such as, but not limited to, a touch screen, may also be employed. Furthermore, in accordance with aspects of the present technique, the user interface 50 may be configured to aid the clinician in manipulating and/or organizing the information displayed on the display 48, and will be described in greater detail with reference to FIGS. 3-8.

Figure 3:
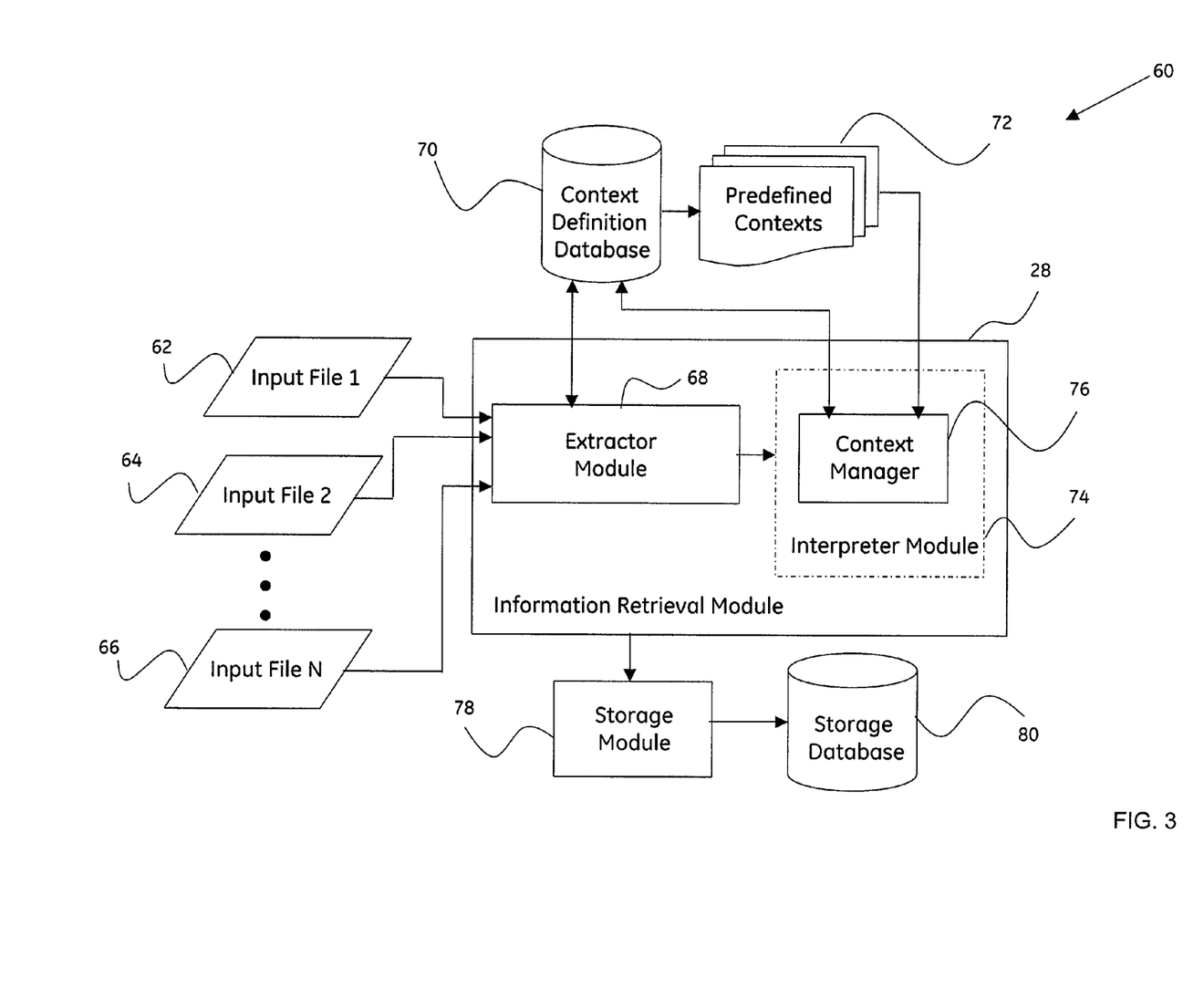
FIG. 3 is a block diagram of an exemplary information retrieval system, in accordance with aspects of the present technique.

Referring now to FIG. 3, a block diagram 60 of one embodiment of an information retrieval system 60 including the information retrieval module 28 of FIG. 1 is depicted. In the example depicted in FIG. 3, reference numerals 62, 64 and 66 are representative of a plurality of log files obtained from one or more data sources, such as imaging systems. In certain embodiments, the log files 62, 64 and 66 respectively correspond to log files obtained from different imaging modalities. Alternatively, if a single imaging modality is employed to acquire image data, then the log files 62, 64 and 66 embody log files generated when images of the same patient are acquired via the same kind of imaging modality and generated over a period of time. Although, the exemplary embodiments illustrated hereinafter are described in the context of a log file generated by a medical imaging system, it will be appreciated that use of the diagnostic system 10 (see FIG. 1) in analyzing machine readable data generated by different data sources are also contemplated in conjunction with the present technique.

As previously noted with reference to FIG. 1, the information retrieval module 28 (see FIG. 1) of the diagnostic system 10 (see FIG. 1) is configured to aid in the analysis of the log file, for example. Accordingly, the one or more log files 62, 64, 66 may be processed by the information retrieval module 28. In one embodiment, the information retrieval module 28 may include an extractor module 68 and an interpreter module 74. The working of the extractor module 68 and the interpreter module 74 will be described in greater detail hereinafter.

In accordance with aspects of the present technique, the extractor module 68 may be configured to extract information of interest from the input log file, such as log file 62, for example. More particularly, in accordance with exemplary aspects of the present technique, the extractor module 68 may be configured to extract information of interest from the log file 62 based upon one or more predefined context definitions. As used herein, the term "context" may be used to refer to a predefined constraint related to the information to be extracted from the log fife. Also, the predefined context definition may include one or more listed contexts, one or more listed sub-contexts or a combination thereof. Furthermore, the predefined context definition may include a contextual element, a temporal element, a structural element, or a combination thereof associated with each of the listed contexts and/or sub-contexts. For example, for each of the listed contexts and/or sub-contexts, the predefined context definition may include elements, such as, but not limited to, expressions configured to define a start of a context, expressions configured to define an end of a context, and a context name. Additionally, the predefined context definition may include expressions to be extracted from the log file. It may be noted that the terms expressions to be extracted and tokens may be used interchangeably. The token may be representative of error code generated by the imaging system 18, in one embodiment. Furthermore, the predefined context definition may include one or more contexts and/or one or more sub-contexts.

As noted hereinabove, the extractor module 68 may be configured to search data in the log file 62 for matching information of interest and extract the information of interest from the log file. In one embodiment, the information of interest to be extracted may include the start of a context, the end of a context and one or more tokens associated with each of the contexts and/or sub-contexts listed in the predefined context definition. Furthermore, the predefined context definitions may be stored in a second storage 70, in one embodiment. In a presently contemplated configuration, the second storage 70 may include a context definition database that is configured to store the predefined context definitions. The extractor module 68 may be configured to query the context definition database 70 to obtain the one or more predefined context definitions, where each of the predefined context definitions may include one or more contexts and/or sub-contexts. More particularly, the extractor module 68 may be configured to query the context definition database 70 to obtain data associated with the information of interest to be extracted. The extractor module 68 may be further configured to parse through the data in the log file 62 to extract the information of interest based upon the predefined context definitions stored in the context definition database 70. Techniques, such as, but not limited to, standard file reading techniques, regular expression techniques, or transformation techniques may be employed by the extractor module 68 to parse through the log file 62 to extract the information of interest.

As will be appreciated, the log file 62 may include a substantial amount of data. For example, a log file may typically have a size in a range from about 100 kilobytes to about 100 megabytes. The extractor module 68 may thus be configured to parse through typically large amount of data in the log file and extract only the information of interest indicated in the context definition database 70. The extractor module 68 may search through the log file for matches based on the information to be extracted. It may be noted that the extractor module 68 may be configured to search for an exact match of the information of interest to be extracted. However, a near match of the information of interest may also be extracted from the log file 62. Furthermore, the extractor module 68 may also be configured to apply proximity matching techniques to extract the information of interest from the log file 62. Subsequent to processing by the extractor module 68, the information of interest may be extracted based on the predefined context definition. In one embodiment, the extracted information of interest, namely the parsed data, may be saved in an output file configured to only include the information of interest that has been extracted from the log file 62. As noted hereinabove, in the present example, the information of interest to be extracted may include the start of a context, the end of a context and one or more tokens associated with each of the contexts and/or sub-contexts listed in the predefined context definition. Consequently, in the present example, the parsed data may include information associated with the start of a context, end of a context, and one or more tokens. The working of the extractor module 68 will be described in greater detail with reference to FIGS. 4-8.

By implementing the extractor module 68 as described hereinabove, the size of the data to be processed downstream is substantially reduced as non-pertinent information is filtered out from the log file based on the predefined context definition. In other words, only relevant information of interest is extracted from the log file for further processing downstream, thereby enhancing the efficiency and speed of the information retrieval process.

In accordance with exemplary aspects of the present technique, the interpreter module 74 may be configured to interpret the extracted information of interest in light of the predefined context definition stored in the context definition database 70. More particularly, the interpreter module 74 may be configured to interpret the extracted tokens in light of the start and end of the corresponding predefined context definition. Furthermore, in one embodiment, the interpreter module 74 may include a context manager 76 configured to facilitate the interpretation of the extracted information of interest based on the predefined context definitions obtained from the context definition database 70. As previously described, the extractor module 68 is configured to identify and extract the information of interest defined in the contexts from the data in the log file 62. The interpreter module 74 may be configured to interpret the information of interest based on the predefined context definitions obtained from the context definition database 70.

In accordance with aspects of the present techniques, the interpreter module 74 may include a context manager 76 configured to aid in facilitating the interpretation of the extracted information of interest based on the predefined context definitions. As previously noted, the extracted information of interest includes the start of the context, the end of the context and one or more associated tokens for each of the listed contexts and/or sub-contexts defined in the predefined context definitions. Accordingly, the parsed data generated by the extractor module 68 may be configured to include the extracted information of interest, where the extracted information of interest may include the start of the context, the end of the context and one or more associated tokens for each of the listed contexts and/or sub-contexts defined in the predefined context definitions.

The context manager 76 may be configured to process the extracted information of interest based upon the predefined context definitions. Accordingly, the context manager 76 may be configured to query the context definition database 70 to obtain information regarding the predefined context definitions. Additionally, the context manager 76 may be configured to generate "context-aware" information. In other words, the context manager 76 may be configured to associate each of the tokens in the extracted information of interest with a corresponding context and/or sub-context. Consequently, the context manager 76 may be configured to generate one or more context instances based upon the predefined context definitions stored in the context definition database 70. More particularly, the context manager 76 may be configured to generate one or more context instances and/or sub-context instances such that each of the generated one or more context instances and/or sub-context instances corresponds to the contexts and/or sub-contexts listed in the predefined context definition. Additionally, the context manager 76 may be configured to associate each of the extracted tokens in the parsed data with a corresponding generated context instance and/or sub-context instance. In other words, the context manager 76 may be configured to determine the context instance and/or sub-context instance associated with each of the tokens in the extracted information of interest and subsequently associate each of the tokens with a corresponding context instance and/or sub-context instance. Hence, each of the extracted tokens is now associated with a corresponding generated context instance and/or sub-context instance. Each of the tokens that is associated with a corresponding context instance and/or sub-context instance may be referred to as an interpreted token. It may also be noted that the terms interpreted token and context-aware token may be used interchangeably.

Moreover, the context manager 76 may also be configured to add contextual attributes to the interpreted tokens. As used herein, the term "contextual attributes" may be used to refer to attributes, such as, but not limited to, a context priority, a context occurrence, a context temporal attribute, a token temporal attribute, a context ranking, a overriding context, or a combination thereof. It may be noted that the contextual attributes may be associated with a state of the data source, such as the imaging system 18 (see FIG. 1). Hence, an output of the context manager 76 may include the interpreted tokens having contextual attributes. These tokens may be referred to as meta-tokens. It may be noted that the terms meta-tokens and context-aware meta-tokens may be used interchangeably. The working of the interpreter module 74 will be described in greater detail with reference to FIGS. 4-8.

By implementing the interpreter module as described hereinabove, context-aware information may be generated. In other words, the interpreter module is configured to determine the context of each of the tokens based on the predefined context definition and accordingly associate each of the tokens with a corresponding context and/or sub-context. Consequent to processing of the parsed data by the interpreter module 74, context-aware information is generated. This context-aware information may be employed to aid technicians in the detection of faults associated with the data source, such as an imaging system and subsequent diagnosis. More particularly, the context-aware information enhances the serviceability of the data source, as the tokens are associated with a corresponding context and/or sub-context, thereby facilitating quick resolution of any faults. Additionally, during the diagnosis of the imaging system, a state of the imaging system 18 during the occurrence of the fault may be easily identified as the meta-tokens include contextual attributes that are representative of the state of the imaging system 18.

The meta-tokens may then be communicated to a storage module 78 for temporary storage. The storage module 78 may include memory, in one embodiment. The meta-tokens may also be communicated to a third storage 80 for permanent storage. In one embodiment, the third storage 80 may include a storage database as depicted in FIG. 3. Post-processing algorithms may then be applied to the meta-tokens. In one embodiment, classification, analysis, search and/or inferencing operations may be applied to the meta-tokens. For example, a trending operation may be applied to these meta-tokens and the results of the trending operation may be fed to a currently available diagnostic system, thereby enabling enhanced interpretation of the meta-tokens and resulting in substantially superior diagnostics and classification. More particularly, use of these meta-tokens by the diagnostic system results in enhanced specificity of solution, decision and/or service of the diagnostic system as meta-tokens include additional tags in the form of contextual attributes. Additionally, use of these meta-tokens permits operating the diagnostic system with relatively fewer data inputs as the meta-tokens include additional information, thereby allowing the relatively faster diagnosis and/or service of the diagnostic system.

It may be noted that the information retrieval module 28 may be configured to simultaneously process multiple log files. For example, the extractor module 68 may be configured to simultaneously parse through data in multiple log files. It may be noted that the information retrieval module 28 may be configured to obtain log files from a variety of imaging systems as previously noted. Alternatively, the information retrieval module 28 may also be configured to obtain different types of log files from a single imaging system. Additionally, a plurality of extractor modules may be operatively coupled either in series or in parallel thereby facilitating delegation of the extraction of information of interest based on different criteria. For example, certain parameters may be relevant based on a system, a system configuration, or on a context of the data. Accordingly, the diagnostic system 10 (see FIG. 1) may be configured to delegate the extraction of data to each of the extractor modules, thereby enhancing the speed of the information retrieval process.

Figure 4:
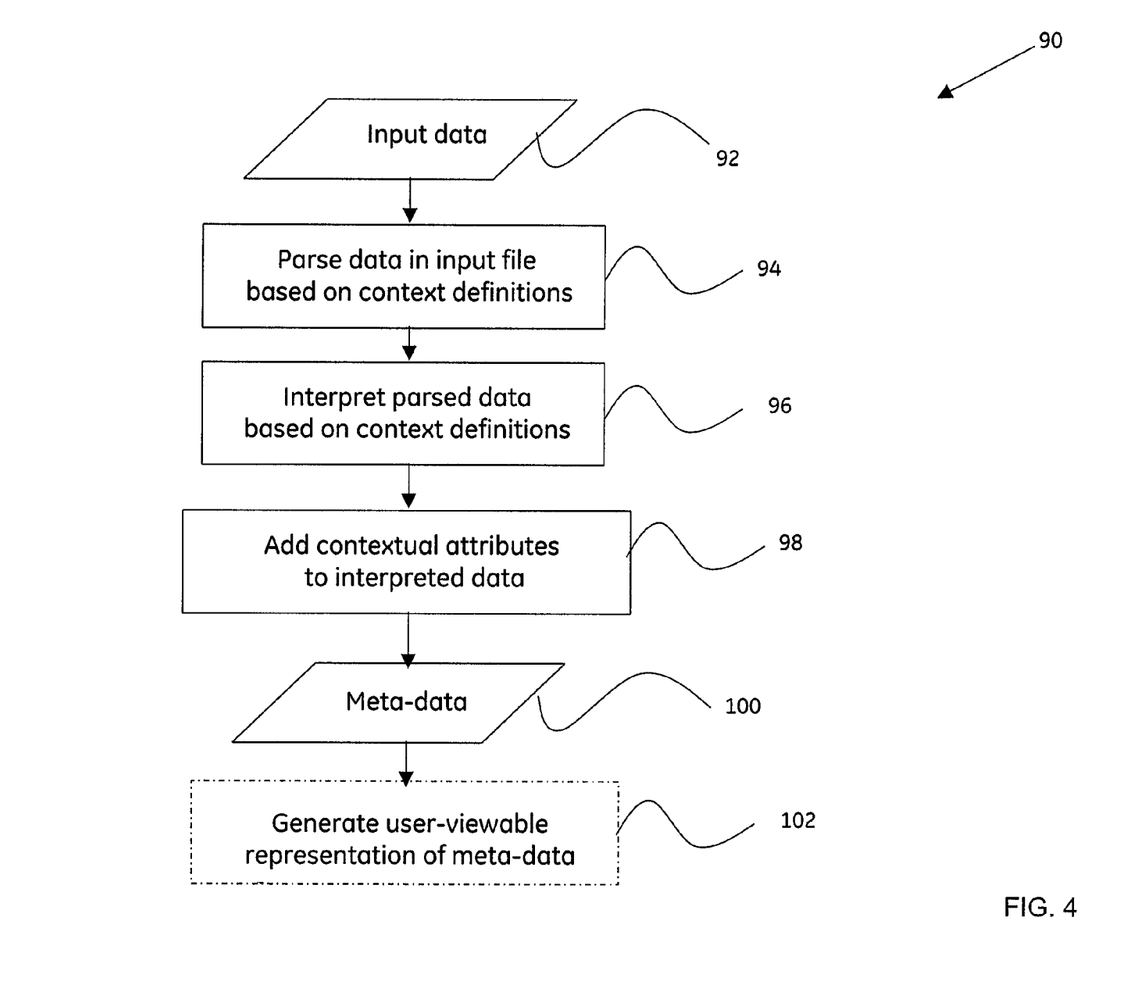
FIG. 4 is a flow chart illustrating an exemplary process of retrieving information of interest from data, in accordance with aspects of the present technique.
Figure 5:
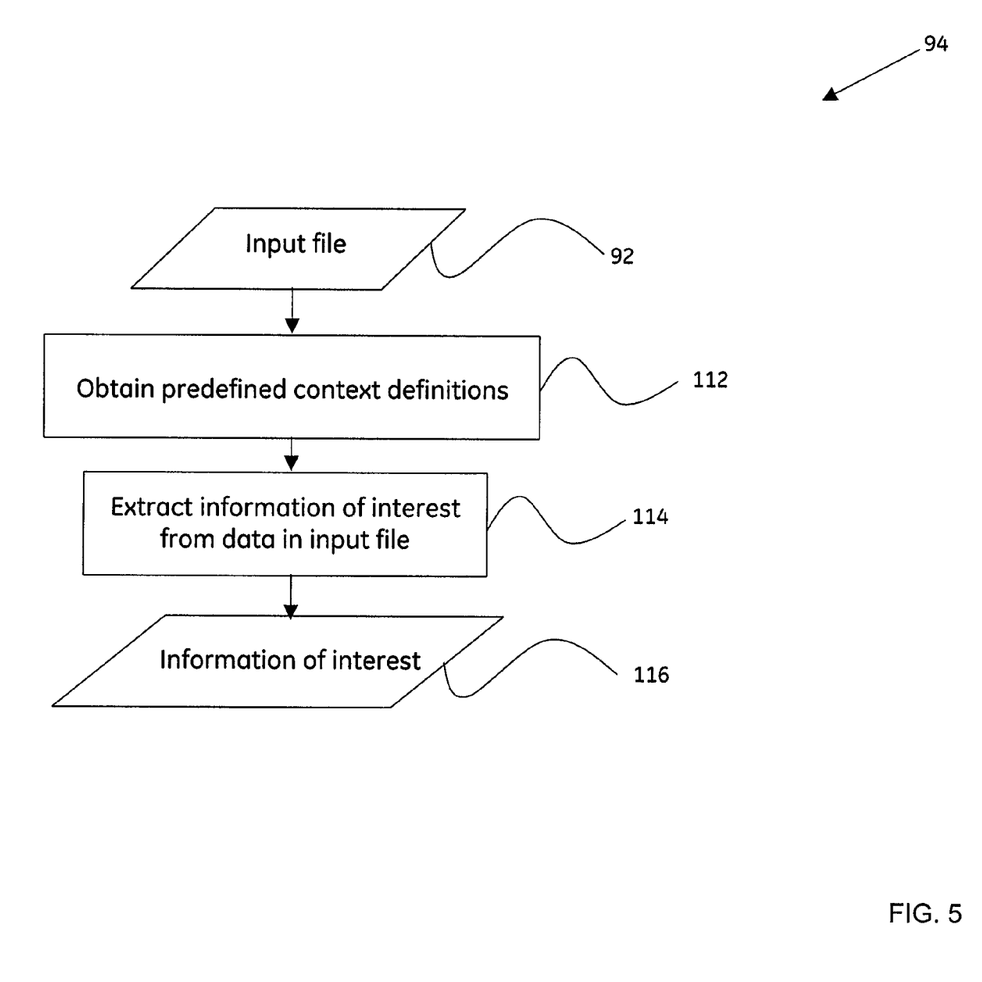
FIG. 5 is a flow chart illustrating an exemplary process of parsing data, in accordance with aspects of the present technique.
Figure 6:
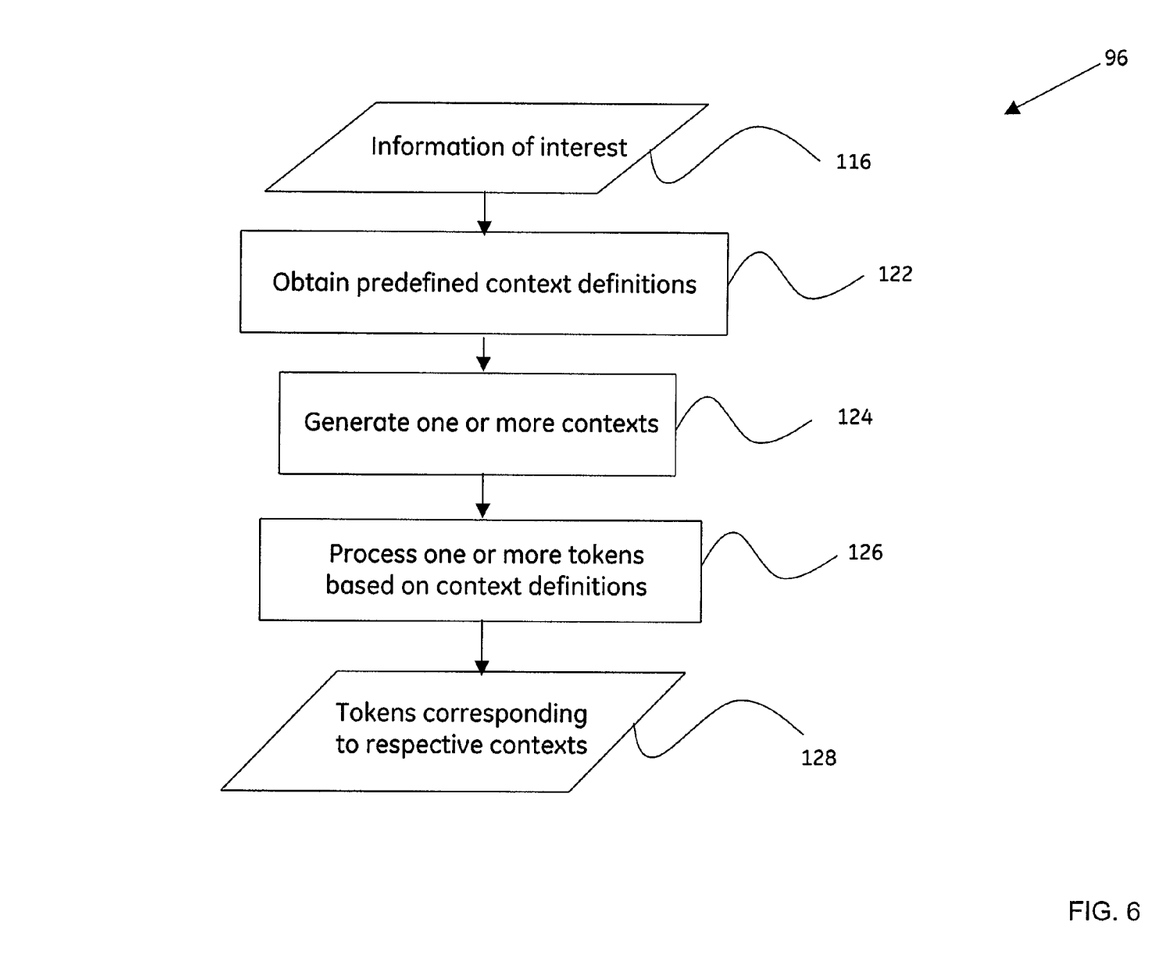
FIG. 6 is a flow chart illustrating an exemplary process of interpreting data, in accordance with aspects of the present technique.

The working of the information retrieval module 28 (see FIG. 1) may be better understood with reference to the exemplary logic depicted in FIGS. 4-6. Referring now to FIG. 4, a flow chart of exemplary logic 90 for information retrieval is illustrated. In accordance with exemplary aspects of the present technique, a method for retrieving information based on predefined context definitions is presented.

The method starts at step 94 where data in an input file 92 is parsed based upon one or more predefined context definitions. Although the present embodiment is described in terms of the data source including a previously stored file, such as a log file, it will be appreciated that step 94 may also be configured to process a real-time data stream. Additionally, the data in the log file may include machine-readable date, as previously noted.

In accordance with exemplary aspects of the present technique, the data in the log file 92 is parsed based on one or more predefined context definitions. The parsing of the data in the log file 92 may be better understood with reference to FIG. 5. A flow chart of exemplary logic for performing step 94 (see FIG. 4), where step 94 includes parsing data in the log file 92 based on the predefined context definitions is illustrated. As previously noted, the predefined context definitions are stored in the context definition database 70 (see FIG. 3). Accordingly, step 94 may entail retrieval of the predefined context definitions from the context definition database 70 as depicted in step 112. In other words, the context definition database 70 may be queried to obtain the predefined context definitions.

Figure 7:
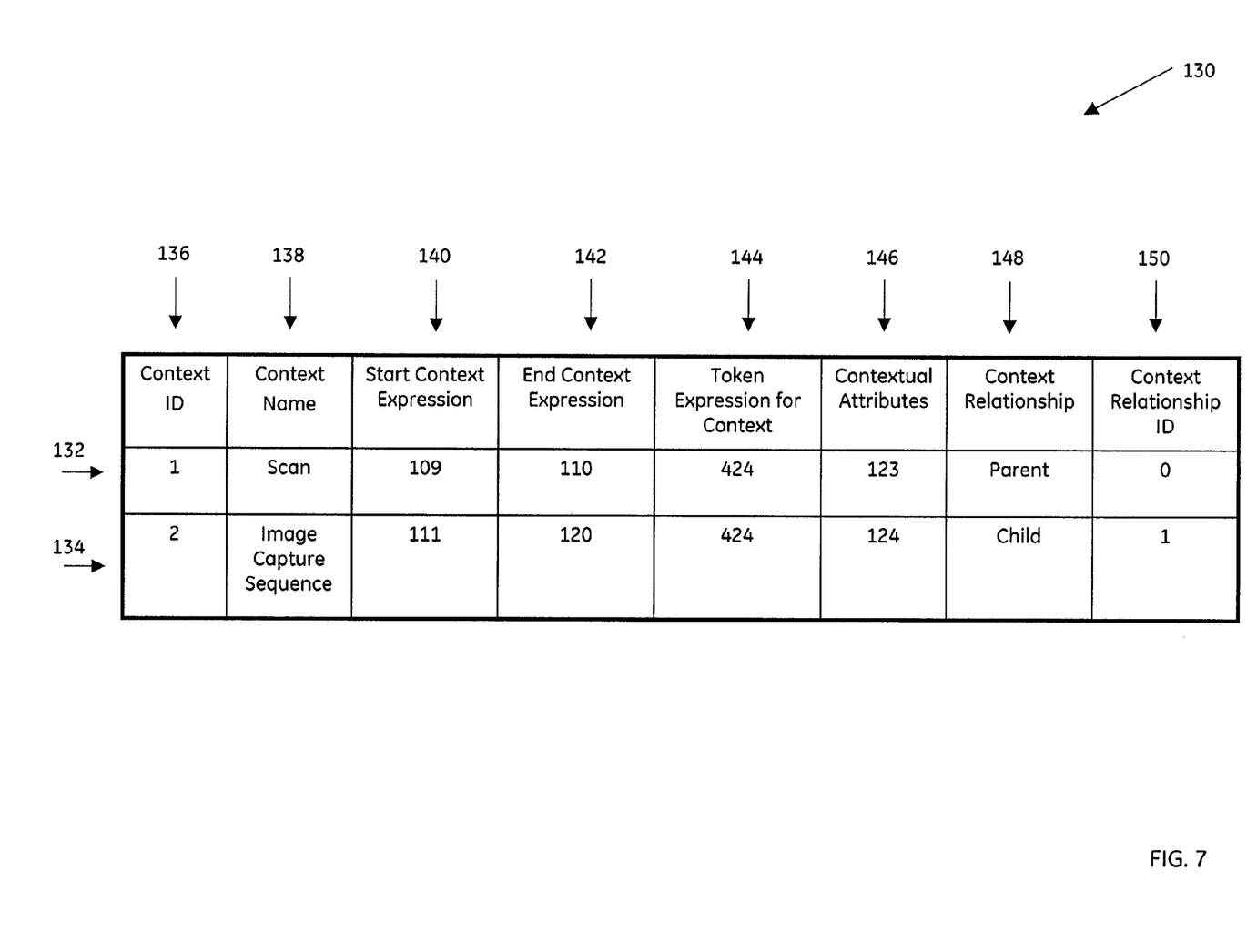
FIG. 7 is a diagrammatic illustration of a predefined context definition, in accordance with aspects of the present technique.

As previously noted, the predefined context definition is described as a predefined constraint related to the information to be extracted from the log file, where the predefined context definition may include one or more listed contexts, one or more listed sub-contexts or a combination thereof and where the predefined context definition may include a contextual element, a temporal element, a structural element, or a combination thereof associated with each of the listed contexts and/or sub-contexts. FIG. 7 illustrates an example 130 of a predefined context definition, in accordance with aspects of the present technique. In the illustrated example, the predefined context 130 is depicted as including one context 132 and a corresponding sub-context 134.

Reference numeral 136 is representative of an identification number of a context and/or sub-context in the predefined context definition 130, while a context name may be represented by reference numeral 138. In the illustrated example, the first context 132 may be referred to as a "scan" context, while a second context (sub-context 134) may be referred to as an "image capture sequence" context. Further, reference numeral 140 may be indicative of a start of a corresponding context, while an end of a context may be represented by reference numeral 142. For example, a start of the "scan" context 132 may be indicated by "109", while an end of the "scan" context 132 may be represented by "110". In a similar fashion, "111" and "120" may be indicative of a start and an end of the "image capture sequence" context 134. It may be noted that in certain other embodiments, reference "109", "110", "111" and "120" may be representative of complex expressions. For example, the complex expression may be indicative of a start of a context, an end of a context and tokens within the scope of the context.

Additionally, reference numeral 144 may be representative of a "token" associated with a particular context. As previously noted, the token is representative of information that the extractor module 68 (see FIG. 3) is configured to retrieve from the log file, such as log files 62, 64, and 66 (see FIG. 3). In one embodiment, the token may be representative of an error code generated by the imaging system 18 (see FIG. 1). Further, reference numeral 146 is indicative of context attributes which may be added to the extracted tokens. As previously noted, the context attributes may include attributes, such as, but not limited to, a priority, an occurrence, a dependency, or overriding contexts. In the example illustrated in FIG. 7, a contextual attribute "123" is associated with the "scan" context 132, while a contextual attribute "124" is associated with the "image capture sequence" sub-context 134.

Figure 8:
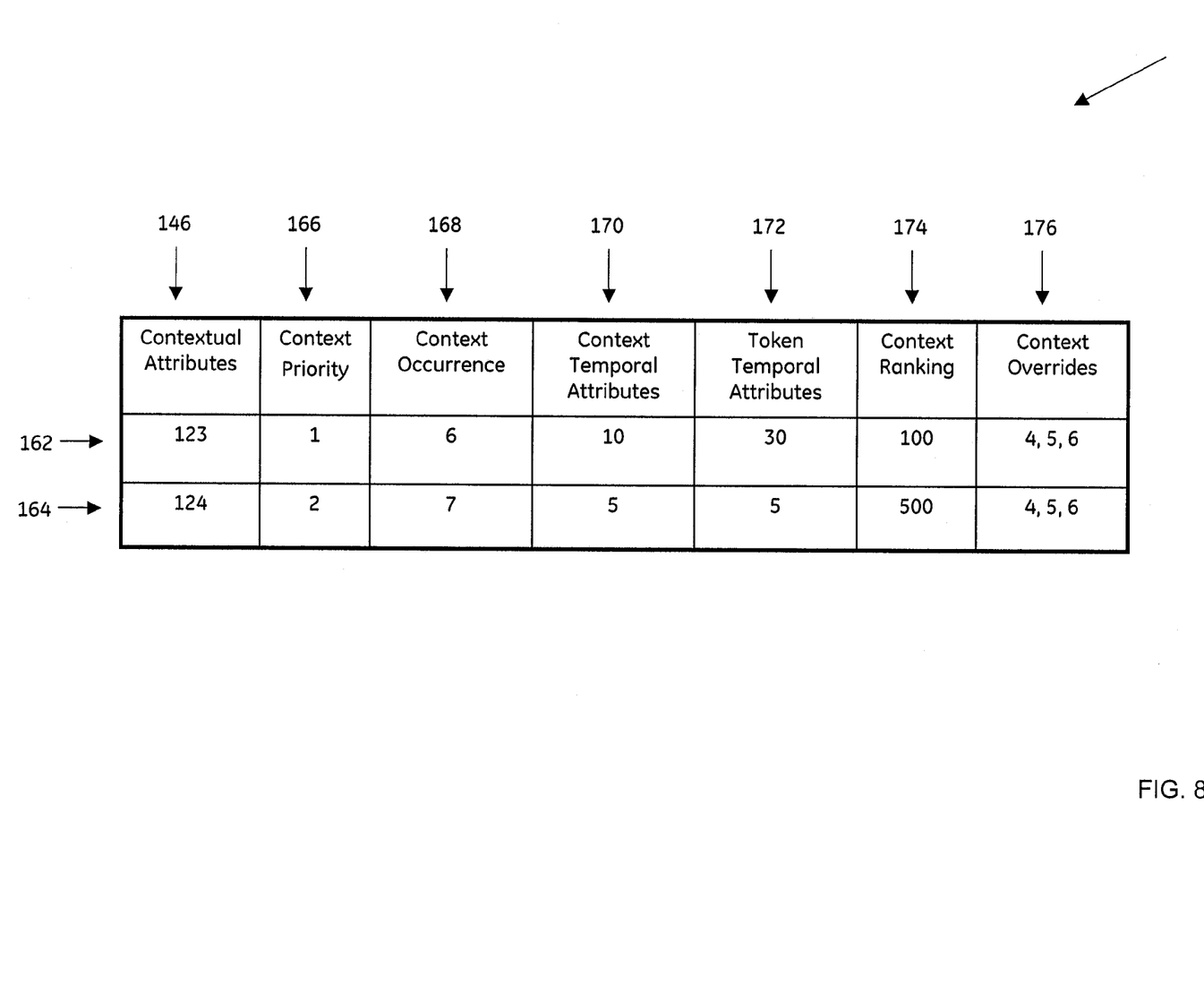
FIG. 8 is a diagrammatic illustration of a contextual attribute for use in the predefined context definition of FIG. 7, in accordance with aspects of the present technique

An example 160 illustrative of contextual attributes 146 (see FIG. 7) is illustrated in FIG. 8. As depicted in the example 160, reference numeral 162 may be representative of the contextual attribute "123" that is associated with the "scan" context 132 (see FIG. 7), while the contextual attribute "124" that is associated with the "image capture sequence" context 134 (see FIG. 7) may be generally represented by reference numeral 164. Furthermore, reference numeral 166 is representative of a context priority, while a context occurrence is represented by reference numeral 168. Similarly, reference numeral 170 is indicative of context temporal attributes. In addition, token temporal attributes may generally be represented by reference numeral 172. It may be noted that the context temporal attributes 170 may be representative of time between say a start and an end of the context, while the token temporal attributes 172 may be indicative of time between a start of the context to the token or between the tokens themselves. Further, a context ranking is generally represented by reference numeral 174, while reference numeral 176 is representative of a context override.

With returning reference to FIG. 7, reference numeral 148 is representative of a context relationship. In the example illustrated in FIG. 7, the "scan" context 132 may be referred to as a "parent" context. In addition, the "image capture sequence" sub-context 134 may be referred to as a "child" context. In other words, the second context 134 is a child of the parent context 132. Furthermore, reference numeral 150 is indicative of a relationship identification number associated with each of the listed predefined context definitions.

Furthermore, with returning reference to FIG. 5, the context definition database 70 (see FIG. 3) may be queried and the predefined context definitions may be retrieved at step 112. More particularly, information of interest to be extracted from the log file 92 may be obtained from the predefined context definition 130 (see FIG. 7). In the present example, the information of interest to be extracted from the log file 92 may include the start ("109") of the "scan" context 132 (see FIG. 7), the end ("110") of the "scan" context 132, and the token "424" associated with the "scan" context 132. Further, as may be seen from the example predefined context definition 130, the information of interest to be extracted from the log file 92 may also include the start ("111") of the "image capture sequence" context 134, the end ("120") of the "image capture sequence" context 134, and the token "424" as depicted in FIG. 7. It may be noted that, in the present example, the token "424" is associated with both the "scan" context 132 and the "image capture sequence" context 134.

Subsequently, at step 114, the data in the log file 92 may be parsed in order to facilitate extraction of the information of interest obtained from the predefined context definition 130. The information of interest to be extracted may include "109", "110", "111", "120" and "424". Accordingly, step 114 may include searching through the data in the log file 92 for "109", "110", "111", "120" and "424". More particularly, the extractor module 68 (see FIG. 3) may be employed to parse through the log file 92 to search for "109", "110", "111", "120" and "424". Once one or more matches are found, the matches may be extracted and output to an output file, where the output file includes the information of interest extracted from the input file 92. This output file may employ a desired structure or a desired semi-structure to format the matches in the output file. Consequent to the extraction at step 114, information of interest 116, if present in the log file 92, may be extracted from the log file 92 and saved in the output file. Accordingly, using the example predefined context definition 130 of FIG. 7, consequent to the parsing of the data in the log file 92 at step 94, the output file may include keywords "109", "110", "111", "120" and two occurrences of the keyword "424".

With returning reference to FIG. 4, consequent to step 94, information of interest 116 (see FIG. 5) is extracted from the log file 92 based on the predefined context definition 130 (see FIG. 7). Following step 94, the parsed data obtained subsequent to step 94 may be interpreted based on the predefined context definitions at step 96. More particularly, at step 96, the output file generated consequent to step 94 may be interpreted based on the predefined context definitions. Step 96 may be better understood with reference to FIG. 6. A flow chart of exemplary logic for performing step 96 (see FIG. 4), where step 96 includes interpreting the parsed data based on the predefined context definition is illustrated. As previously noted, the predefined context definitions are stored in the context definition database 70 (see FIG. 3). Accordingly, the step 96 may entail retrieval of the predefined context definitions from the context definition database 70 as depicted in step 122.

As previously noted with reference to FIG. 3, the interpreter module 74 may be configured to associate each of the tokens with a corresponding context and/or sub-context. Accordingly, at step 124, one or more context instances may be generated. It may be noted that the number of context instances generated at step 124 is dependent upon the number of contexts and/or sub-contexts in the predefined context definitions. For example, the sample context definition 130 depicted in FIG. 7 is shown as including one context ("scan" context 132) having a corresponding start of context "109" and an end of context "110" and one sub-context ("image capture sequence" context 134) having a corresponding start of context "111" and an end of context "120". Consequently, the context manager 76 is configured to generate a first context instance upon encountering the keyword "109" or when an expression indicative of a start of the context is satisfied. Similarly, a second context instance may be generated by the context manager 76 upon encountering the keyword "111". Hence, at step 124, two context instances may be generated to correspond to the contexts 132, 134 in the predefined context definition 130.

Following the generation of the two context instances at step 124, the information of interest 116 that has been extracted from the log file 92 may be processed based on the predefined context definition 130, at step 126. More particularly, each of the tokens in the extracted information of interest 116 may be associated with a corresponding generated context instance based upon the predefined context definitions. For example, referring again to the predefined context definition 130 in FIG. 7, a first token expression "424" is associated with the "scan" context 132, while a second token expression "424" is associated with the "image capture sequence" context 134. Also, the information of interest 116 includes two occurrences of the tokens "424".

These two tokens "424" may then be processed to ascertain an association with a corresponding generated context instance at step 126. Accordingly, upon encountering the first token "424" in the output file including the information of interest 116, the context manager 76 in the interpreter module 74 may be configured to verify the antecedents of the first token "424". In other words, on encountering the first token "424", the context manager 76 may be configured to determine if the first token "424" corresponds to the "scan" context 132 (see FIG. 7). More particularly, the context manager 76 may also be configured to verify the first token "424" occurs between the start "109" and the end "110" of the "scan" context 132. Subsequently, if it is determined by the context manager 76 that the first token "424" corresponds to the "scan" context 132, then the first token "424" may be associated with the first context instance that corresponds to the "scan" context 132, thereby creating a first interpreted token. Similarly, if the context manager 76 establishes that the second token "424" is related to the "image capture sequence" context 134, then the second token "424" may be associated with the second context instance that corresponds to the "image capture sequence" sub-context 134, thereby creating a second interpreted token. As used herein, the "interpreted token" is used to refer to the extracted token that has been interpreted in light of a corresponding context and/or sub-context. Therefore, consequent to step 126, one or more interpreted tokens 128 may be generated.

With returning reference to FIG. 4, subsequent to step 96, one or more interpreted tokens 128 (see FIG. 6) may be generated. In accordance with exemplary aspects of the present technique, contextual attributes corresponding to each of the interpreted tokens 128 may be appended to the interpreted tokens 128, at step 98. As previously noted, the contextual attributes may include to attributes, such as, but not limited to, a context priority, a context occurrence, a context temporal attribute, a token temporal attribute, a context ranking, a overriding context, or a combination thereof. Consequent to step 98 where contextual attributes are added to each of the interpreted tokens 128, meta-tokens 100 may be generated. The term "meta-tokens" is used to refer to the interpreted tokens having corresponding contextual attributes appended thereto. For example, referring now to FIG. 8, the contextual attribute "123" 146 (see FIG. 7) associated with "scan" context 132 (see FIG. 7) may generally be referred to reference numeral 162, as previously noted. Further, as depicted in FIG. 8, the contextual attribute "123" 162 may include a context priority 166 of "1", a context occurrence 168 of "6", a context temporal attribute 170 of "10", a token temporal attribute 172 of "30", a context ranking 174 of "100" and a context override 176 of "4, 5, 6". In a similar fashion, the contextual attribute "124" 146 (see FIG. 7) associated with "image capture sequence" sub-context 134 (see FIG. 7) may be generally represented be reference numeral 164, as previously noted. Additionally, the contextual attribute "124" may include a context priority 166 of "2", a context occurrence 168 of "7", a context temporal attribute 170 of "5", a token temporal attribute 172 of "5", a context ranking 174 of "500" and a context override 176 of "4, 5, 6".

As previously noted, the predefined context definition, such as the predefined context definition 130 depicted in FIG. 7, may include temporal elements. These temporal elements may be employed to further aid in troubleshooting the imaging system 18 (see FIG. 1), for example. In other words, the use of these temporal elements 170, 172 may be employed to facilitate addition of a time context to the occurrence of the token. Referring now to FIG. 8, reference numerals 170 and 172 are respectively representative of a context temporal attribute and a token temporal attribute. Further, the contextual attribute "123" that is associated with the "scan" context 132 (see FIG. 7), is shown as including a token temporal attribute of "30". Accordingly, the technician troubleshooting the imaging system 18 that generated the log file may be able to interpret a fault based on the occurrence of the token within "10" time units after the start of the context "109" or "10" time units before end of the context "110".

With continuing reference to FIG. 4, following the generation of meta-tokens 100 at step 98, user viewable representations of the meta-tokens 100 may be generated for visualization on a display, such as display 48 (see FIG. 2), at step 102. More particularly, the user-viewable representations may be created to include representation of the meta-tokens 100 and the predefined context definitions.

As will be appreciated by those of ordinary skill in the art, the foregoing example, demonstrations, and process steps may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, such as C++ or Java. Such code, as will be appreciated by those of ordinary skill in the art, may be stored or adapted for storage on one or more tangible, machine readable media, such as on memory chips, local or remote hard disks, optical disks (that is, CDs or DVDs), or other media, which may be accessed by a processor-based system to execute the stored code. Note that the tangible media may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The method of information retrieval based on predefined context definitions and the system for information retrieval described hereinabove dramatically simplify procedural workflow of information retrieval and enhance speed of procedural time taken to detect and/or diagnose faults in machinery. Further, a flexible system that decouples information retrieval rules is based on contextual, temporal and/or structural elements is provided, thereby allowing the individual subsystems to be upgraded, configured and scaled to a desired level. Additionally, as the system is configured to delegate responsibilities to each of the components to perform specific portions of information retrieval, the system is agnostic to a given location.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for retrieving information of interest from data, the method comprising:
   parsing log data of a machine based upon a predefined context definition;
   interpreting the parsed log data based on the predefined context definition; and
   adding contextual attributes to the interpreted log data to generate meta-data;
   wherein the information of interest comprises a start of a context, an end of a context, one or more tokens, a context relationship, and a contextual attribute.

2. The method of claim 1, wherein the predefined context definition comprises a contextual element, a temporal element, a structured element, or a combination thereof.

3. The method of claim 1, wherein the log data comprises machine-readable data obtained from a data source, and wherein the data source comprises a data stream or archived data.

4. The method of claim 3, wherein the data source comprises an imaging system, and wherein the imaging system comprises one of a computed tomography imaging system, a positron emission tomography imaging system, a magnetic resonance imaging system, an X-ray imaging system, a nuclear medicine imaging system, an ultrasound imaging system, or combinations thereof.

5. The method of claim 1, wherein parsing the log data comprises:
   obtaining the predefined context definition from a second storage; and
   extracting information of interest from the log data based on the predefined context definition.

6. The method of claim 1, wherein the information of interest comprises an identification number.

7. The method of claim 5, wherein interpreting the parsed log data comprises:
   obtaining the predefined context definition from the second storage;

generating one or more contexts based upon the predefined context definition; and processing the extracted information of interest based upon the predefined context definition.

8. The method of claim 7, wherein processing the extracted information of interest comprises associating one or more tokens in the extracted information of interest with a corresponding generated context based upon the predefined context definition.

9. The method of claim 7, wherein adding contextual attributes comprises appending contextual attributes to the extracted tokens to generate meta-tokens.

10. The method of claim 9, wherein the meta-tokens are representative of a state of a data source.

11. The method of claim 9, further comprising storing the meta-tokens in a third storage.

12. The method of claim 11, further comprising analyzing the meta-tokens.

13. The method of claim 11, further comprising generating a user-viewable representation of the meta-tokens and the predefined context definition.

14. A computer readable medium comprising one or more tangible media, wherein the one or more tangible media comprise:

code adapted to parse log data of a machine based upon a predefined context definition, wherein the code adapted to parse log data of the machine includes code adapted to extract information of interest from the log data based on the predefined context definition, the information of interest including a start of a context, an end of a context, and one or more tokens;

code adapted to interpret the parsed log data based on the predefined context definition; and code adapted to add contextual attributes including a context relationship to the interpreted log data to generate meta-data.

15. The computer readable medium, as recited in claim 14, wherein the code adapted to parse the log data includes code adapted to obtain the predefined context definition from a second storage.

16. The computer readable medium, as recited in claim 15, wherein the code adapted to interpret the parsed log data comprises:

code adapted to obtain the predefined context definition from the second storage;

code adapted to generate one or more contexts based upon the predefined context definition; and code adapted to process the extracted information of interest based on the predefined context definition.

17. The computer readable medium, as recited in claim 14, further comprising code adapted to generate a user-viewable representation of the meta-data and the predefined context definition.

18. An information retrieval system, comprising:

a computer including a processor to execute code stored in a non-transitory computer-readable memory, the code including:

an extractor module configured to parse log data of a machine based upon a predefined context definition and to extract information of interest from the log data based on the predefined context definition, the information of interest including a start of a context, an end of a context, and one or more tokens; and an interpreter module configured to:
 interpret the parsed log data based on the predefined context definition; and
 add contextual attributes including a context relationship to the interpreted log data to generate meta-data.

19. The system of claim 18, wherein the system is configured to obtain the log data from a data storage subsystem configured to store data, and wherein the data storage subsystem is in operative association with the information retrieval system.

20. The system of claim 18, wherein the predefined context definition comprises a contextual element, a temporal element, a structured element, or a combination thereof.

21. The system of claim 18, wherein the extractor module is further configured to obtain the predefined context definition from a second storage.

22. The system of claim 21, wherein the interpreter module is further configured to:

obtain the context definition from the second storage;
generate one or more contexts based upon the predefined context definition; and
process the extracted information of interest based upon the predefined context definition.

23. A system, comprising:

a data source, wherein the data source comprises:
 an acquisition subsystem configured to acquire data;
 a processing subsystem in operative association with the acquisition subsystem and configured to:
  process the acquired data;
  generate log data of a machine;
a data storage subsystem configured to store the log data;
an information retrieval subsystem in operative association with the data storage subsystem and configured to:
 parse the log data based upon a predefined context definition and to extract information of interest from the log data based on the predefined context definition, the information of interest including a start of a context, an end of a context, and one or more tokens;
 interpret the parsed log data based on the predefined context definition; and
 add contextual attributes including a context relationship to the interpreted log data to generate meta-data.

24. The system of claim 23, further configured to generate a user-viewable representation of the meta-data and the predefined context definition.

25. The system of claim 23, wherein at least one token of the one or more tokens represents an error code generated by the machine.

* * * * *